(12) United States Patent
Galvin, Jr. et al.

(10) Patent No.: US 8,820,629 B1
(45) Date of Patent: Sep. 2, 2014

(54) BARCODE SCANNING FOR COMMUNICATION

(71) Applicant: International Business Machines Corporation, Armonk, NY (US)

(72) Inventors: James Patrick Galvin, Jr., Georgetown, KY (US); David S. Marshak, Wrentham, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/778,871

(22) Filed: Feb. 27, 2013

(51) Int. Cl.
  *G06F 17/00* (2006.01)
(52) U.S. Cl.
  USPC .................. 235/375; 235/487; 235/462.09
(58) Field of Classification Search
  CPC .... G06Q 30/02; G06Q 20/3274; G07F 17/32; G07F 17/3206; G07F 17/3239; G07F 17/3255
  USPC ............... 235/375, 462.01, 462.09, 385, 487, 235/462.1
  See application file for complete search history.

(56) References Cited

U.S. PATENT DOCUMENTS

| | | | | |
|---|---|---|---|---|
| 8,251,287 | B2* | 8/2012 | Kochevar | 235/382 |
| 2007/0145113 | A1* | 6/2007 | Keller et al. | 235/377 |
| 2008/0011827 | A1* | 1/2008 | Little et al. | 235/380 |
| 2010/0042846 | A1* | 2/2010 | Trotter et al. | 713/182 |
| 2010/0069035 | A1* | 3/2010 | Johnson | 455/404.1 |
| 2010/0324936 | A1* | 12/2010 | Vishnubhatla et al. | 705/3 |
| 2011/0082747 | A1 | 4/2011 | Khan et al. | |
| 2011/0234371 | A1* | 9/2011 | Linton et al. | 340/5.7 |
| 2012/0055983 | A1* | 3/2012 | Wellborn et al. | 235/375 |
| 2012/0061458 | A1 | 3/2012 | Bahr et al. | |
| 2012/0072274 | A1* | 3/2012 | King et al. | 705/14.16 |
| 2013/0321554 | A1* | 12/2013 | Martinsen et al. | 348/14.02 |

OTHER PUBLICATIONS http://www.qrdvark.com/qr-formats/geo/, downloaded Feb. 20, 2013, pp. 1-2.
http://www.emfast.com/documents/Barcode_Routing_Tech_Overview.pdf, downloaded Feb. 20, 2013, pp. 1-2.
http://verify.im/news.php, downloaded Feb. 20, 2013, pp. 1-6.
Carolyn M. Ricci, Passive RFID/Active RTLS Solutions Enhance the Future of Enterprise Resource Management, http://www.rfidjournal.net/PDF_download/Zebra_10-29_webinar.pdf, Oct. 29, 2008, pp. 1-31.
"QT Code—Our Latest Security/Promotional Feature," http://www.quicktick.com/QT_Code.html, downloaded Feb. 20, 2013, pp. 1-2.
"Goldmine Dezine, QR Barcodes, Smart Ideas for Smart Phones," http://goldminedezine.com/qr.html, downloaded Feb. 20, 2013, pp. 1-15.

* cited by examiner

*Primary Examiner* — Edwyn Labaze
(74) *Attorney, Agent, or Firm* — Holland & Knight LLP; Brian J. Colandreo, Esq.; Jeffrey T. Placker, Esq.

(57) ABSTRACT

A method, computer program product, and system for barcode scanning for communication is described. Barcode information is received. Location information associated with the barcode information is identified. Communication session information associated with a user is determined based upon, at least in part, the identified location information.

22 Claims, 3 Drawing Sheets

BARCODE SCANNING FOR COMMUNICATION

TECHNICAL FIELD

This disclosure relates to electronic communication.

BACKGROUND

Information of various types may be encoded in graphical form as one or more barcodes, including linear barcodes, in which parallel bars of various widths and spacing may represent encoded information, and matrix (or "two-dimensional") barcodes, in which encoded information may be represented by a two-dimensional pattern of shading (e.g., Quick Response ("QR") codes). Barcodes may typically be configured to be machine-readable, in order to facilitate retrieval and decoding of the information they represent for various purposes. Mobile computing devices and related applications may sometimes provide the capability to capture and/or decode barcodes of various types. For example, a camera-equipped cellular phone may be utilized to capture an image of a barcode (e.g., a QR code) and an internal (and/or remote) application may be utilized to decode the information encoded therein.

BRIEF SUMMARY OF THE DISCLOSURE

According to one aspect of the disclosure, a computer-implemented method includes receiving, by one or more computing devices, barcode information. The method includes identifying, by the one or more computing devices, location information associated with the barcode information. The method includes determining, by the one or more computing devices, communication session information associated with a user based upon, at least in part, the identified location information.

One or more of the following features may be included. The communication session information may include preference information associated with the user. The preference information may indicate a preferred device for electronic communication. The communication session information may include an availability status associated with the user. Determining the communication session information may include associating the location information with the user with respect to an enhanced emergency services system. The method may include establishing an electronic communication connection based upon, at least in part, the communication session information. The electronic communication connection may be associated with a prior electronic communication session. Establishing the electronic communication connection may be based upon, at least in part, identifying scheduling information associated with the communication connection.

According to another aspect of the disclosure, a computer program product resides on a computer readable storage medium that has a plurality of instructions stored on it. When executed by a processor, the instructions cause a processor to perform operations including receiving barcode information. The operations include identifying location information associated with the barcode information. The operations include determining communication session information associated with a user based upon, at least in part, the identified location information.

One or more of the following features may be included. The communication session information may include preference information associated with the user. The preference information may indicate a preferred device for electronic communication. The communication session information may include an availability status associated with the user. Determining the communication session information may include associating the location information with the user with respect to an enhanced emergency services system. The operations may include establishing an electronic communication connection based upon, at least in part, the communication session information. The electronic communication connection may be associated with a prior electronic communication session. Establishing the electronic communication connection may be based upon, at least in part, identifying scheduling information associated with the communication connection.

According to another aspect of the disclosure, a computing system includes one or more processor devices and one or more memory architectures coupled with the one or more processor devices. The one or more processor devices are configured to receive barcode information. The one or more processor devices are configured to identify location information associated with the barcode information. The one or more processor devices are configured to determine communication session information associated with a user based upon, at least in part, the identified location information.

One or more of the following features may be included. The communication session information may include preference information associated with the user. The preference information may indicate a preferred device for electronic communication. The communication session information may include an availability status associated with the user. Determining the communication session information may include associating the location information with the user with respect to an enhanced emergency services system. The one or more processor devices may be configured to establish an electronic communication connection based upon, at least in part, the communication session information. The electronic communication connection may be associated with a prior electronic communication session. Establishing the electronic communication connection may be based upon, at least in part, identifying scheduling information associated with the communication connection.

According to another aspect of the disclosure, a computer-implemented method includes receiving, by one or more computing devices, barcode information. The method includes identifying, by the one or more computing devices, location information associated with the barcode information. The method includes determining, by the one or more computing devices, communication session information associated with a user based upon, at least in part, the identified location information. The method includes establishing, by the one or more computing devices, an electronic communication connection associated with the user based upon, at least in part, the communication session information.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
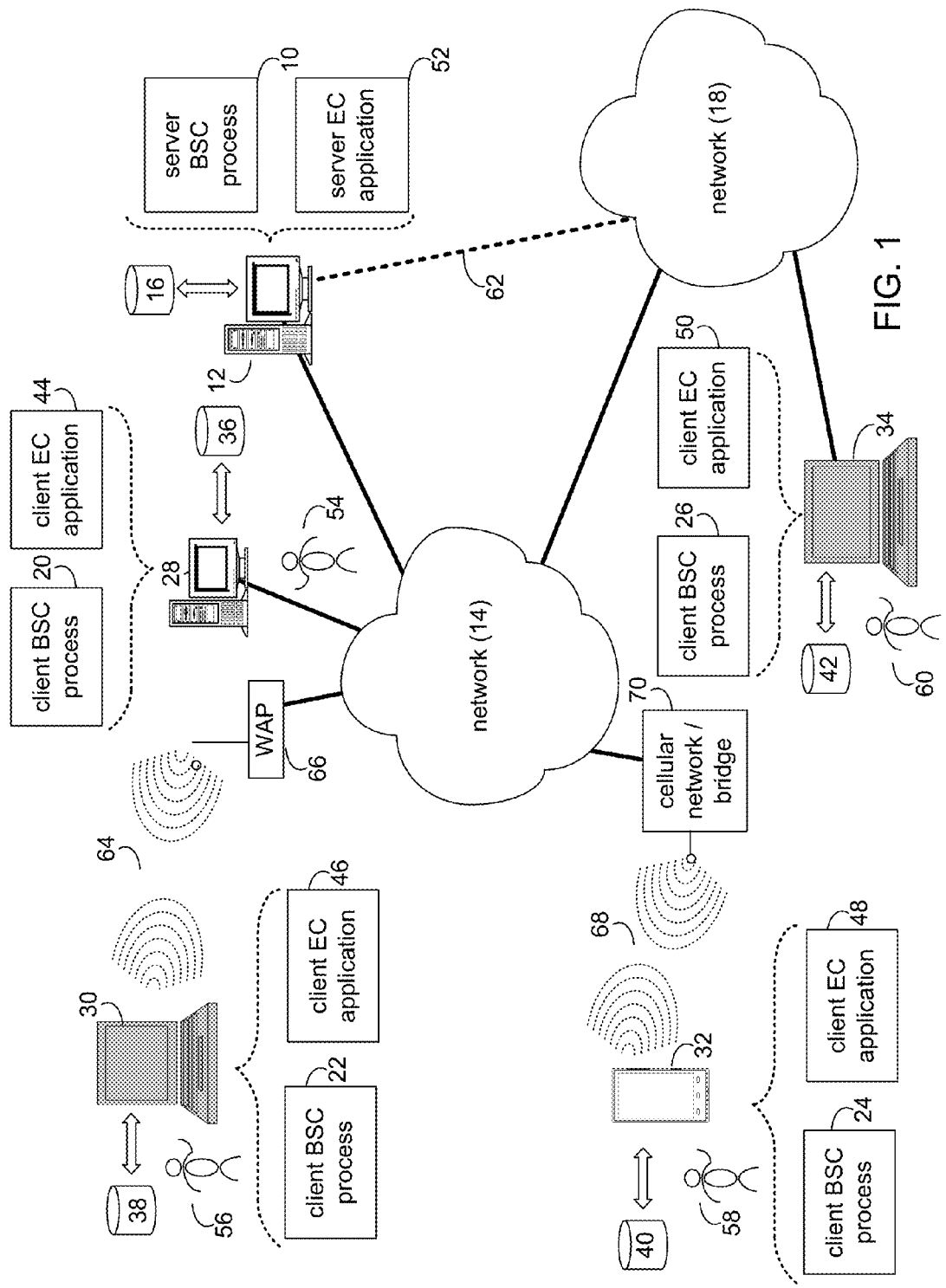
FIG. 1 is a diagrammatic view of a barcode scanning for communication process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As part of their professional, personal or other activities, individuals may travel between various locations from time to time. For example, during the workday an individual may move from her office to a conference room, then to a team room, then to a video conference room, then back to her office. As an individual moves between locations, she may desire to continue to participate in various work activities, such as electronic collaboration on team projects, participation in various forms of electronic communication (e.g., email, telephonic communication, video conferencing, text-based communication, and so on), and so on. It may accordingly be useful to provide a system (and/or application and so on) that may facilitate individuals engaging in electronic communication and collaboration as the individual relocates from one location to another.

Information of various types may be encoded in graphical form as one or more barcodes, including linear barcodes and matrix (or "two-dimensional") barcodes such as Quick Response ("QR") codes. In certain instances, barcodes may encode information relating to a location (e.g., the location of the barcode or another reference location) and/or various other information, such as available resources associated with a location (e.g., electronic devices available at a particular location). Mobile computing devices (such as camera-equipped cellular phones) may sometimes include the capability to capture and/or decode barcodes of various types. As such, for example, it may be useful to provide a system (and/or application and so on) through which an individual may utilize a mobile computing device (or other electronic device) to scan a barcode in a particular location, in order to facilitate various electronic communication capabilities associated with that individual and/or that location. In a related manner, a barcode may encode information associated with a particular user (e.g., employee identification information, or the like). Similarly, computing devices including the capability to capture and/or decode barcodes of various types may be associated with various locations (e.g., access control locations, offices, conference rooms, etc.). As such, scanning a barcode related to an individual (e.g., associated with an identification card, etc.) at a particular location (e.g., via a barcode scanner associated with a particular location) may facilitate various electronic communication capabilities associated with that individual and/or that location. A barcode scanning for communication ("BSC") process (and/or application) may provide this and/or other functionality.

Referring now to FIG. 1, a BSC process may be coupled to a computer or computer network. For example, server BSC process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server® Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server BSC process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademark of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client BSC processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client BSC processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the BSC process may be a server-side process (e.g., which may be implemented via server BSC process 10), in which all of the functionality of the BSC process may be executed on a server computer (e.g., server computer 12). In an embodiment, the BSC process may be a client-side process (e.g., which may be implemented via one or more of client BSC processes 20, 22, 24, 26), in which all of the functionality of the BSC process may be executed on a client computing device (e.g., one or more of client electronic devices 28, 30, 32, 34). In an embodiment, the BSC process may be a hybrid server-client process (e.g., which may be implemented by server BSC process 10 and one or more of client BSC processes 20, 22, 24, 26), in which at least a portion of the functionality of the BSC process may be implemented via server computer 12 and at least a portion of the functionality of the BSC process may be implemented via one or more client computing devices (e.g., one or more of client electronic devices 28, 30, 32, 34).

In certain embodiments, a BSC process may be a stand-alone process. In certain embodiments, a BSC process may operate as part of, or in conjunction with, one or more other processes and/or may include one or more other processes. For example, in certain embodiments, a BSC process may be included in (or may operate in conjunction with) a electronic communication ("EC") application (or process).

An electronic communication ("EC") application (or process) may be an application (or process) that may facilitate communication among individuals via one or more of a variety of electronic means including phone calls, instant messaging, chat rooms, text messaging, emails, video conferencing, and so on. For example, an EC application may facilitate communication among individuals using telephones (e.g., landlines, cell phones, and so on), various other computing devices (e.g., text input devices, microphones, and so on), and/or other means. In certain embodiments, an EC application may include and/or relate to unified telephony functionality. For example, an EC application may be an application such as a Sametime® Unified Telephony application, which may facilitate integration of telephony across multivendor Public Branch Exchange (PBX) systems and provide a unified end user experience, including integrated softphone, telephone and IM presence awareness, as well as call management and control across multiple communications systems. (Sametime is a registered trademark of International Business Machine Corp. in the United States, other countries, or both.)

Individuals may communicate using an EC application via voice, text, video, and/or various other communication types. In certain embodiments, an EC application may facilitate communication among individuals using protocols such as voice over internet protocols ("VoIP"), which may facilitate voice and/or video communication using internet protocols.

In certain embodiments, an EC application (and/or a BSC application) may be part of and/or may interoperate with a social networking application (or process) (not shown), which may provide various types of social networking functionality.

An EC application (or process) may operate (and/or reside) on a client device (e.g., client EC application 44, operating on client electronic device 28; client EC application 46, operating on client electronic device 30; client EC application 48, operating on client electronic device 32; or client EC application 50, operating on client electronic device 34). A client BSC process (e.g., client BSC process 20) or a server BSC process (e.g., server BSC process 10) may be in communication with a client EC application (e.g., client EC application 44) or may be part of a client EC application.

An EC application may additionally/alternatively operate (and/or reside) on a server device (e.g., server EC application 52, operating on server computer 12 or another server EC application (not shown), operating on another server computer (not shown)). A server BSC process (e.g., server BSC process 10) or a client BSC process (e.g., client BSC process 20) may be in communication with a server EC application (e.g., server EC application 52) or may be a part of a server EC application.

The various client and/or server devices (and/or client and/o server BSC processes) may include image-capturing capabilities (e.g., to facilitate capture of images or other information regarding a particular barcode) and/or may interoperate with other devices or processes with such capabilities. The various client and/or server devices (and/or client and/o server BSC processes) may similarly include decoding capabilities (e.g., to facilitate decoding of encoded barcode information) and/or may interoperate with other devices or processes with such capabilities.

Users 54, 56, 58, 60 may access a BSC process in various ways. For example, these users may access server BSC process 10 directly through the device on which a client process (e.g., client BSC processes 20, 22, 24, 26) is executed, namely client electronic devices 28, 30, 32, 34. Users 54, 56, 58, 60 may access server BSC process 10 directly through network 14 and/or through secondary network 18. Further, server computer 12 (i.e., the computer that executes server BSC process 10) may be connected to network 14 through secondary network 18, as illustrated with phantom link line 62. Users 54, 56, 58, 60 may also access a client or server EC application (or process) in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client BSC process 24 will be described for illustrative purposes. It will be understood that client BSC process 24 may, for example, interact and/or communicate with a server BSC process such as server BSC process 10 and/or may be executed within one or more applications that allow for communication with other server and/or client BSC processes. This is not intended to be a limitation of this disclosure, as other configurations are possible (e.g., BSC process 24 may include stand-alone client processes and/or stand-alone server processes). For example, some implementations may include one or more of client BSC processes 20, 22, 26 or server BSC process 10 in place of or in addition to client BSC process 20.

Figure 2:
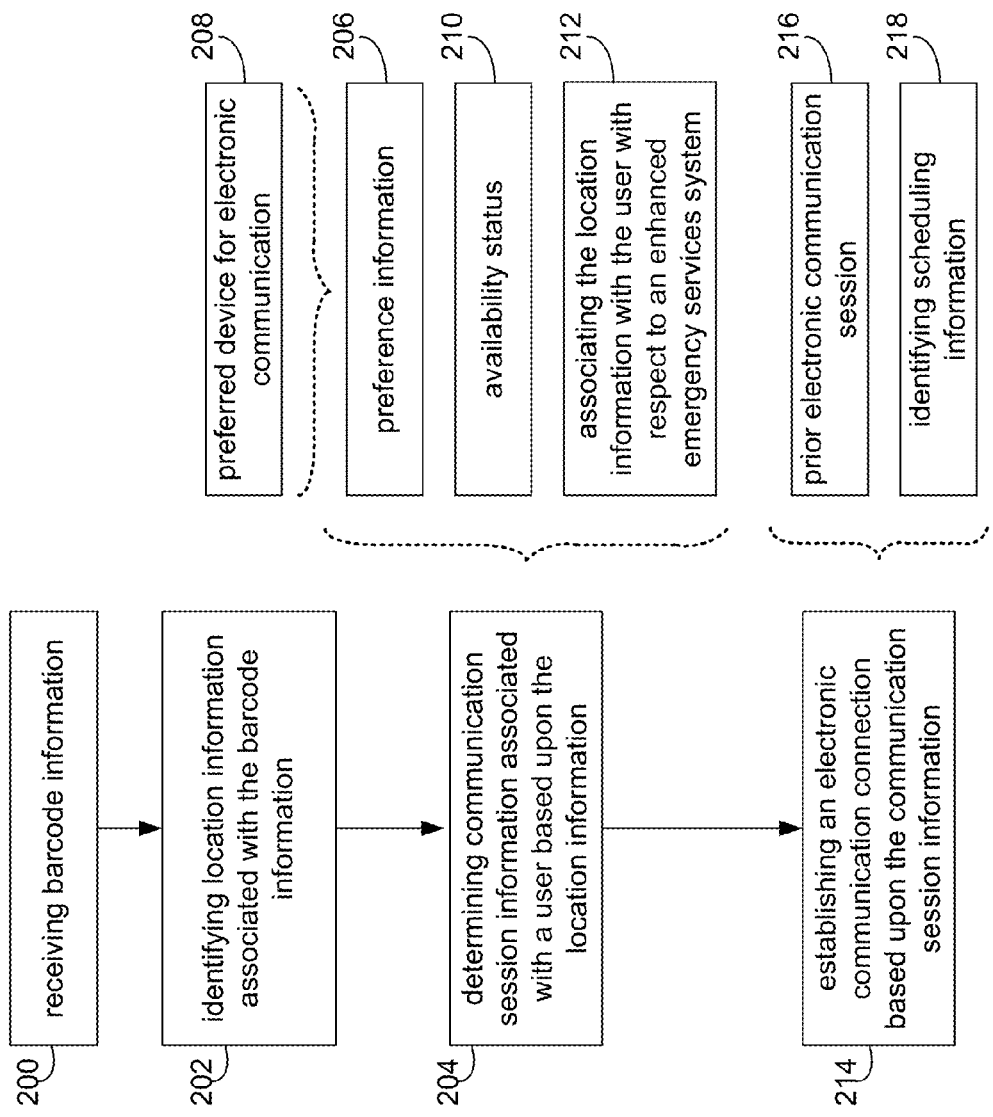
FIG. 2 is a flowchart of a process executed by the barcode scanning for communication process of FIG. 1.

Referring now also to FIG. 2, there is shown a diagrammatic view of an example process that may be implemented by a BSC process, e.g., client BSC process 24. Client BSC process 24 may receive 200 barcode information. As also noted above, in encoded form, barcode information may be represented by various graphical encodings of a variety of information types. For example, information may be encoded in linear barcodes and/or matrix barcodes such as QR codes. Various electronic devices may be capable of scanning and/or otherwise capturing such graphical encoding. For example, camera-equipped cellular phones or tablets or other mobile computing devices (e.g., desktop computers on carts or other mobile platforms) may be capable of capturing images or other representations of various barcode types. In certain embodiments, the information encoded in such barcodes may be decoded through an associated application (e.g., a QR code reader forming part of a cellular phone application) and the decoded barcode information may be transmitted to BSC process 24. In certain embodiments, BSC process 24 may receive 200 encoded barcode information and may decode the information through internal functionality and/or an external application. In certain embodiments, BSC process 24 may include image capturing capability (i.e., to capture an image of a barcode) and/or decoding capability (i.e., to decode barcode information) and/or may interoperate with one or more other processes (and/or applications or devices) with such capability. Similarly, standalone and/or special purpose barcode capture and/or decoding apparatus may be utilized.

BSC process 24 may identify 202 location information associated with the received 200 barcode information. For example, in certain embodiments a particular barcode may be located in a particular location (e.g., a particular conference room, workstation, meeting room seat, and so on) and/or may be associated with a particular location. Such location (and/or association) may, for example, be included in the information encoded in the barcode. For example, the barcode may be provided in the particular location, e.g., for the purpose of identifying the location. Additionally/alternatively the barcode may be provided for other reasons (e.g., inventory control, equipment identification, etc.), but may additionally include associated location information (e.g., which may indicate a location of a piece of equipment, or the like). Accordingly, for example, a portion of barcode information received 200 by BSC process 24 may represent a particular location. In certain embodiments, location information may include other location information in addition/as an alternative to information designating a particular location. For example, a barcode associated with a particular conference room may represent location information that includes the actual location of the conference room (e.g., "Blue room, fourth floor east, corporate research building") as well as various other information associated with the conference room location such as available devices (e.g., workstations, telephones, video-conferencing equipment, etc.), location rules (e.g., cellular phones not allowed, no talking, no outside calls) and so on.

As generally discussed above, in certain embodiments, a barcode capture and/or decoding device (e.g., which may include a client electronic device) may have associated location information (e.g., which may be stored on the client electronic device and/or in a datastore, such as a database, and/or may be determined based upon a current actual location of such a device). The barcode capture and/or decoding device may receive 200 barcode information, and the barcode information (e.g., which may include information identifying a particular user) may be associated with the location information of the barcode capture and/or location information of the device. For example, location information may be identified 202 based upon location information associated with the encoded information of a scanned barcode and/or based upon location information associated with a location at which a barcode capture and/or decoding device is utilized to scan a barcode.

In certain embodiments, location information (and/or other information) associated with a barcode may be represented by data stored separately from the barcode itself. For example, a barcode for a particular conference room may include information representing a link (and/or other reference) to a data repository (e.g., storage device 16), which repository may include data representing various location information associated with that conference room (e.g., available devices, rules, scheduling information, and so on). In this way, for example, location information for such a room may be updated (i.e., updated on the data repository) to reflect currently available devices, current scheduling information, current rules, and so on, without necessarily requiring a change in the actual barcode (or barcodes) associated with the MOM.

BSC process 24 may determine 204 communication session information associated with a user based upon, at least in part, the identified location information. Communication session information associated with a user may be information associated with and/or otherwise relevant to one or more electronic communication sessions (e.g., telephone calls, video conferences, text-based communication sessions, and so on) associated with the user.

In certain embodiments, the determined 204 communication session information may include preference information 206 associated with the user. For example, a user may have previously input preference information associated with a particular location, which may indicate, for example, a preferred device 208 for electronic communication at a particular location, a preferred availability status 210 associated with the user, and various other preference information. For example, when at a particular location (e.g., a particular conference room, airline courtesy lounge, classroom, and so on) an individual may prefer to be contacted only via a particular device (e.g., a particular cellular phone, fixed line phone, tablet computing device, and so on). Accordingly, BSC process 24 may determine 204 communication session information indicating such preference for such preferred device 208. BSC process 24 (alone and/or in conjunction with another process) may then, for example, route to the preferred device 208 various incoming electronic communications that are directed toward this user. For example, BSC process 24 may route calls made to an office phone of a user to the courtesy phone of an airline courtesy lounge if such courtesy phone has been selected as a preferred device 208 for that location.

Similarly, for example, when at a particular location (e.g., a particular conference, an airline courtesy lounge, a classroom, and so on) an individual may prefer to display a particular availability status 210 with respect to one or more EC, social networking, and/or other applications. For example, because she may be engaged with note-taking (or otherwise), an individual may desire her availability status 210 with respect to an instant messaging application and a social networking application to show, that she is "busy," "working" or otherwise "unavailable" while she is present in a particular classroom. Such desire may be determined, for example, based upon receiving predefined user preferences associated with BSC process 24, the classroom, the instant messaging application, and/or the social networking application. BSC process 24 may determine 204 communication session information indicating this preference to display an "unavailable" status 210 and may accordingly cause (alone and/or in conjunction with another application or process) such status 210 to be displayed with respect to the appropriate EC, social networking and/or other application.

In certain embodiments, BSC process 24 may determine availability status 210 based upon, at least in part, scheduling information. For example, if an individual scans the barcode of a conference room indicating her presence in the conference room, and a calendar entry, email message or other information indicates that a meeting is scheduled to be in progress in that conference room, BSC process 24 may determine that the individual has entered a meeting in progress and that an appropriate availability status 210 may accordingly be "In a Meeting."

In certain embodiments, determining 204 communication session information may include associating 212 the identified 202 location information with the user with respect to an enhanced emergency services system. An enhanced emergency services system may be a system that assists emergency response personnel in locating an individual who has called to request (or otherwise sought) emergency services using a mobile device. For example, an enhanced emergency services system may receive location information from cellular phone towers (and/or other sources) in order to approximate the location of an individual who has called for emergency assistance using a cellular phone. Due to limitations in such location information, however, the accuracy of such approximation may be less than desirable. For example, such information may specify location only within a relatively large margin of error and may not include detailed location information within buildings (e.g., the particular floor on which the individual is located). Accordingly, for example, it may be useful for BSC process 24 to associated 212 the identified 202 location information with the user and to provide such information to an enhanced emergency services system in the event that the user seeks emergency services while in the particular location. For example, a user may scan a barcode indicating that she has entered the boardroom on the 19th floor of a downtown high-rise, then may dial 911 to report heart palpitations. If the individual, for example, passes out before specifying her location (or were to otherwise be unable to provide detailed location information) BSC process 24 may usefully provide location information (i.e., as identified 202 based upon the received 200 bar code information) to the emergency services system in order to assist rapid provision of emergency assistance.

BSC process 24 may establish 214 an electronic communication connection based upon, at least in part, the determined 204 communication session information. An electronic communication connection may be a particular connection or channel over which an individual may participate in a particular electronic communication session. For example, as also noted above, BSC process 24 may (alone and/or in conjunction with another application or process) facilitate the routing of incoming calls associated with the user to a device associated with the location of the scanned barcode and/or a related user preference (e.g., a device determined based upon identified 202 location information, determined 204 preference information 206, and so on). For example, if BSC process 24 has received 200 barcode information indicating that an individual has entered a hotel room, calls that would otherwise be directed to the individual's office telephone may be rerouted to the hotel room telephone. Similarly, BSC process 24 may establish 214 outgoing electronic communication connections based upon the communication session information. For example, continuing the discussion above, if an individual has scanned a barcode indicating that he has entered a hotel room and the individual then dials a number on his cellular phone (and/or otherwise acts to initiate an outbound cellular phone call), BSC process 24 may identify the intended target of the outbound call, and facilitate routing of the call through the hotel room's landline telephone rather than the cellular phone (e.g., based upon preference information 206 indicating an individual's preference not to use his cellular phone to make calls when traveling outside of his network coverage). For example, an individual may scan a barcode indicating that he has entered his hotel room, then may click "Call home" on his cellular phone. In response, and as facilitated by BSC process 24, the hotel room telephone may ring and the individual may pick up the hotel telephone handset to hear the telephone dialing his home telephone number.

In certain embodiments, the established 214 electronic communication connection may be associated with prior electronic communication session 216. For example, BSC process 24 may determine (e.g., based on user input, calendar information, monitoring of communication session activity, and so on) that an individual ended a particular communication session (e.g., a telephone call, video conference, or instant messaging session) shortly before traveling to the location from which barcode information has been received 200. BSC process 24 may further determine (e.g., based on user input, calendar information, monitoring of communication session activity, and so on) that the individual may desire to continue that communication session in the new location (e.g., the room where the scanned barcode is located). Accordingly, BSC process 24 may facilitate continuation of the prior session (i.e., the session that the individual ended in order to travel to the new location) by establishing 214 an electronic communication connection related to the prior session. For example, if an individual is participating in a conference call in a first conference room and needs to leave for another conference room because of an imminent scheduled meeting in the first conference room, upon receiving 200 barcode information from the individual scanning a barcode in the other conference room, identifying 202 associated location information (e.g., actual location, available devices, and so on), and determining 204 communication session information based upon the location information (e.g., temporary contact information for the individual in the other conference room, availability status 210 for the individual, and so on), BSC process 24 may establish 214 an electronic communication connection that may facilitate the individual continuing the conference call. For example, BSC process (e.g., alone or in conjunction with an EC application) may automatically dial into the conference call bridge using a telephone located in the other conference room.

In certain embodiments, establishing 214 an electronic communication connection may be based upon, at least in part, identifying 218 scheduling information associated with the communication connection. Scheduling information may be information relating to the scheduled time and date of a communication session, a type of communication connection associated with such a scheduled communication session (e.g., a video conferencing, telephonic, text-based or other connection), participant or other connection information associated with the communication session (e.g., telephone numbers, IP addresses, bridge server identities, and so on), and so on. Identifying 218 such scheduling information may, for example, facilitate establishing 214 an appropriate electronic communication connection for a particular scheduled communication session. For example, an individual may be scheduled to participate in a video conference at 10:30 on Monday morning (e.g., as indicated by calendar entries, email messages, text messages, and so on). At 10:28 AM, BSC process 24 may receive 200 barcode information indicating that the user has entered a particular conference room (e.g., based upon the individual scanning a barcode associated with that conference room), and may accordingly identify 202 location information associated with the conference room (e.g., the location of the room and the availability of certain video conferencing equipment in the room). BSC process 24 may further determine 204, for example, based upon identifying 202 the availability of video conferencing equipment and analysis of entries in the user's calendar, that it may be appropriate for the individual to participate in the scheduled teleconference in the recently-entered conference room. Accordingly, at 10:30 AM, BSC process may facilitate connecting the individual to the video conference via the video conferencing equipment in the conference room (e.g., by automatically dialing into the video conference using the video conferencing equipment, in order to establish 214 the appropriate communication connection).

It will be understood that BSC process 24 may establish 214 an electronic communication connection automatically and/or in response to user input. For example, continuing the discussion above, before dialing into the 10:30 AM video conference, BSC process 24 may prompt the individual (e.g., with an input window displayed on cellular phone 32) for input regarding whether the individual wishes BSC process 24 to establish 214 an appropriate connection and/or regarding various characteristics of the connection (e.g., a preferred device, a preferred screen name, and/or other preferred settings). It will further be understood that BSC process 24 may establish 214 electronic communication connections alone and/or in conjunction with various other applications or processes (e.g., an EC application or process).

In certain embodiments, a user may scan a barcode as she is leaving a particular location in addition/as an alternative to scanning a barcode when she is entering a particular location (and/or at another time). For example, BSC process 24 may receive 200 barcode information from a user scanning a barcode upon entering a conference room, may identify 202 associated location information, may determine 204 communication session information, and may execute various related functionality (e.g., establishing 214 an electronic communication connection based upon the determined 204 communication session information). As noted above, this may be useful, for example, in order to facilitate electronic communication with (and by) the user while she is in the location with which the barcode is associated. Upon leaving (and/or at another time), a user may rescan the barcode (and/or scan a different barcode, such as an "exit" barcode) in order to indicate that she may no longer be available for communication at that location (e.g., because she is leaving the location). BSC process 24 may accordingly receive barcode information indicating that the user may no longer be associated with the identified 202 location information and/or the determined 204 communication session information, and so on.

Figure 3:
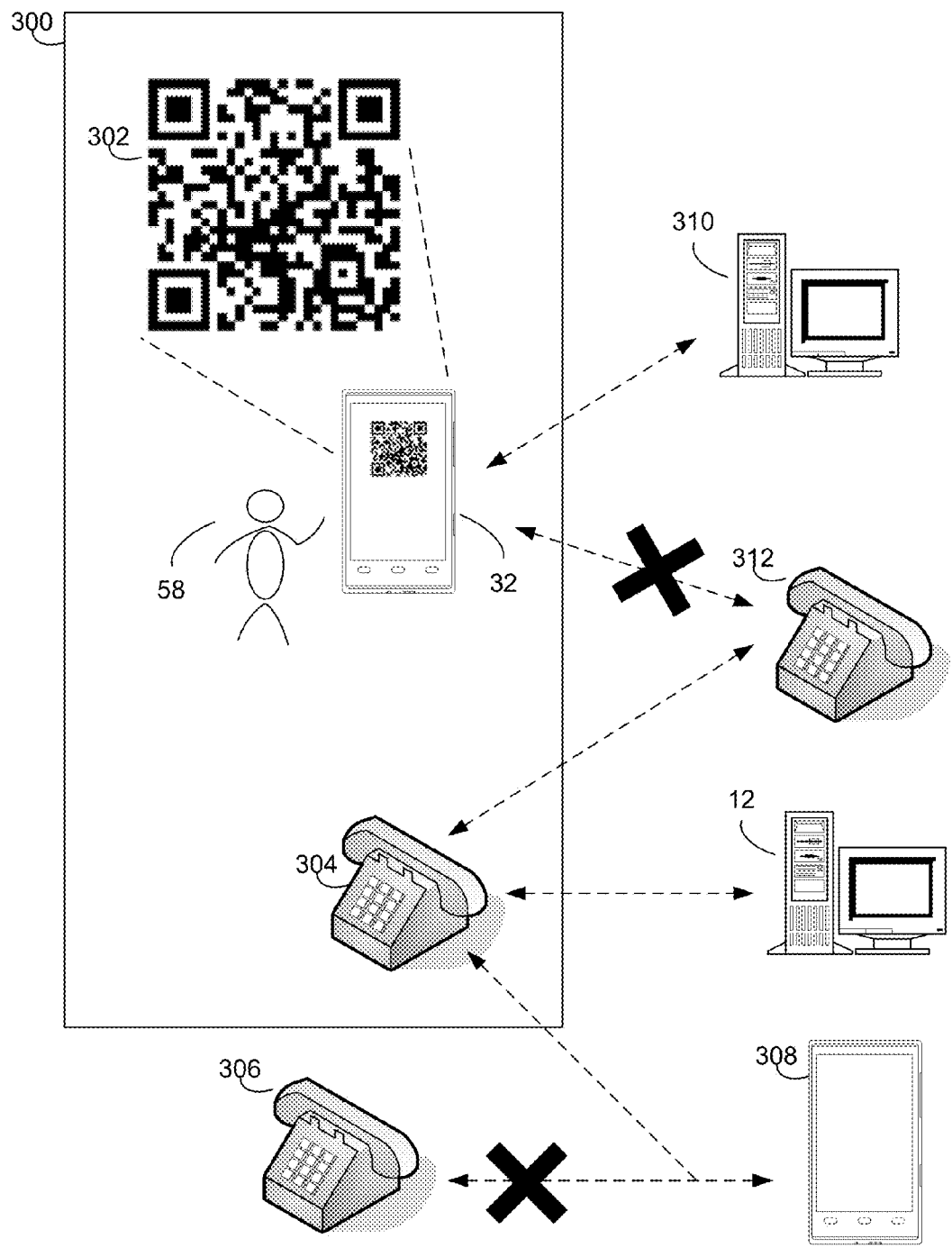
FIG. 3 is a diagrammatic view of an aspect of the barcode scanning for communication process of FIG. 1.

Referring now also to FIG. 3, during a workday user 58 may leave his office and enter conference room 300. Upon entering conference room 300, for example, user 58 may utilize camera-equipped cellular phone 32 to scan barcode 302 (e.g., a representation that conference room 300 is the "second floor conference room of 300 Washington St."). Accordingly, BSC process 24 may receive 200 barcode information represented by barcode 302.

Continuing the example, conference room 300 may be equipped with various electronic communication devices, such as computers (not shown), telephones (e.g., VoIP-enabled telephone 304), video conferencing equipment (not shown), and so on. Accordingly, based upon receiving 200 barcode information represented by barcode 302, BSC process 24 may identify 202 various location information associated with conference room 300 including, for example, that the location of conference room 300 is "second floor conference room of 300 Washington St.," and that conference room 300 is equipped with the various electronic communication devices noted above. As noted above, the equipment available in conference room 300 (and/or various other information) may be identified 202 directly from information represented by barcode 302 and/or may be identified 202 based on a link or other reference, represented by barcode 302, to a data storage device.

BSC process 24 may further determine 204 various communication session information associated with user 58. For example, BSC process 24 may determine 204 preference information 206 associated with user 58 and/or conference room 300, such as the preference that preferred device 208 for communication while in conference room 300 may be VoIP-enabled telephone 304. Accordingly, for example, BSC process may facilitate (e.g., directly and/or in combination with an EC application) the automatic forwarding to VoIP-enabled telephone 304 of incoming calls directed towards user 58. For example, a call made to office phone 306 of user 58 from cellular phone 308 may be automatically routed instead to VoIP-enabled telephone 304 based upon the determined 204 preference information 206.

In certain embodiments, BSC process 24 may associate 212 the identified 202 location information with user 58 with respect to enhanced emergency services. For example, if user 58 utilizes cellular phone 32 to place a call for emergency assistance (e.g., a call routed through enhanced emergency services server 310), detailed location information regarding user 58 (i.e., that user 58 is currently located in the second floor conference room of 300 Washington St.) may be provided to enhanced emergency services server 306. This may, for example facilitate a more rapid and/or more effective response to an emergency involving user 58.

In certain embodiments, BSC process 24 may establish 214 (e.g., in conjunction with one or more EC applications) one or more electronic communication channels for user 58. For example, based upon determining 204 that user 58 is in the same location as VoIP-enabled telephone 304, and determining that user 58 interrupted a call between the office phone of user 58 and VoIP-enabled telephone 312 (i.e., prior electronic communication session 216) in order to relocate to conference room 300, BSC process 24 may establish 214 a communication channel between VoIP-enabled telephones 304 and 312 in order to facilitate user 58 continuing the prior call in the new location. For example, user 58 may enter conference room 300, may scan barcode 302 with cellular phone 32 and may then, as facilitated by BSC process 24, hear VoIP-enabled telephone 304 ring, indicating an electronic communication connection facilitating continuation of the interrupted prior call.

As another example, based upon determining 204 that user 58 is in the same location as VoIP-enabled telephone 304 (and/or various other devices (not shown)), and identifying 218 scheduling information indicating an upcoming teleconference with a project team (e.g., based upon analysis of calendar entries, email messages, and so on), BSC process 24 may establish 214 (e.g., in conjunction with one or more EC applications) a connection between VoIP-enabled telephone 304 (and/or various other devices (not shown)) and an appropriate teleconference server (e.g., server computer 12) in order to facilitate user 58 participating via VoIP-enabled telephone 304 (and/or various other devices (not shown)) in the scheduled teleconference.

As another example, user 58 may attempt to initiate a cellular call to VoIP-enabled telephone 312 using cellular phone 32, but the call may be unsuccessful (e.g., because the cellular signal available to cellular phone 32 is weak at this location). Accordingly, BSC process 24 may establish 214 (e.g., in conjunction with one or more EC applications) a connection between VoIP-enabled telephone 304 (and/or various other devices (not shown)) and VoIP-enabled telephone 312 in order to facilitate the desired call.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
   receiving, by one or more computing devices, on a mobile device of a user, barcode information of a barcode associated with a location;
   identifying, by the one or more computing devices, location information associated with the barcode information; and
   determining, by the one or more computing devices, communication session information associated with the user based upon, at least in part, the identified location information associated with the barcode information, wherein the communication session information includes preference information associated with the user and a communication session associated with the user.

2. The computer-implemented method of claim 1 wherein the preference information indicates a preferred device for electronic communication.

3. The computer-implemented method of claim 1 wherein the communication session information includes an availability status associated with the user.

4. The computer-implemented method of claim 1 wherein determining the communication session information includes associating the location information with the user with respect to an enhanced emergency services system.

5. The computer-implemented method of claim 1 further comprising:
   establishing an electronic communication connection based upon, at least in part, the communication session information.

6. The computer-implemented method of claim 5 wherein the electronic communication connection is associated with a prior electronic communication session.

7. The computer-implemented method of claim 5 wherein establishing the electronic communication connection is based upon, at least in part, identifying scheduling information associated with the communication connection.

8. A computer program product residing on a non-transitory computer-readable storage medium having a plurality of instructions stored thereon, which, when executed by a processor, cause the processor to perform operations comprising:
   receiving, on a mobile device of a user, barcode information of a barcode associated with a location;
   identifying location information associated with the barcode information; and
   determining communication session information associated with the user based upon, at least in part, the identified location information associated with the barcode information, wherein the communication session information includes preference information associated with the user and a communication session associated with the user.

9. The computer program product of claim 8 wherein the preference information indicates a preferred device for electronic communication.

10. The computer program product of claim 8 wherein the communication session information includes an availability status associated with the user.

11. The computer program product of claim 8 wherein determining the communication session information includes associating the location information with the user with respect to an enhanced emergency services system.

12. The computer program product of claim 8 wherein the operations further comprise:
    establishing an electronic communication connection based upon, at least in part, the communication session information.

13. The computer program product of claim 12 wherein the electronic communication connection is associated with a prior electronic communication session.

14. The computer system of claim 13 wherein the one or more processor devices are further configured to:
    establish an electronic communication connection based upon, at least in part, the communication session information.

15. The computer system of claim 14 wherein the electronic communication connection is associated with a prior electronic communication session.

16. The computer system of claim 14 wherein establishing the electronic communication connection is based upon, at least in part, identifying scheduling information associated with the communication connection.

17. The computer program product of claim 12 wherein establishing the electronic communication connection is based upon, at least in part, identifying scheduling information associated with the communication connection.

18. A computer system comprising:
    one or more processor devices; and
    one or more memory architectures coupled with the one or more processor devices;
    wherein the one or more processor devices are configured to:
       receive, on a mobile device of a user, barcode information of a barcode associated with a location;
       identify location information associated with the barcode information; and
       determine communication session information associated with the user based upon, at least in part, the identified location information associated with the barcode information, wherein the communication session information includes preference information associated with the user and a communication session associated with the user.

19. The computer system of claim 18, wherein the preference information indicates a preferred device for electronic communication.

20. The computer system of claim 18 wherein the communication session information includes an availability status associated with the user.

21. The computer system of claim 18 wherein determining the communication session information includes associating the location information with the user with respect to an enhanced emergency services system.

22. A computer-implemented method comprising:
- receiving, by one or more computing devices, on a mobile device of a user, barcode information of a barcode associated with a location;
- identifying, by the one or more computing devices, location information associated with the barcode information;
- determining, by the one or more computing devices, communication session information associated with the user based upon, at least in part, the identified location information, wherein the communication session information includes preference information associated with the user and a communication session associated with the user; and
- establishing, by the one or more computing devices, an electronic communication connection associated with the user based upon, at least in part, the communication session information associated with the barcode information.

* * * * *